United States Patent
Hsueh (12) 
(10) Patent No.: US 6,409,181 B1
(45) Date of Patent: Jun. 25, 2002

(54) COMBINATION TYPE ELECTRIC DRILL CHUCK STRUCTURE

(76) Inventor: Chun Chu Hsueh, No. 129, Mei-Feng, Xue-Jia Town Tainan Hsien (TW)

( * ) Notice: Subject to any disclaimer, the term of this patent is extended or adjusted under 35 U.S.C. 154(b) by 145 days.

(21) Appl. No.: 09/619,706

(22) Filed: Jul. 19, 2000

(51) Int. Cl.[7] ............................................... B23B 31/12
(52) U.S. Cl. .......................... 279/62; 279/902; 279/140
(58) Field of Search .............................. 279/60–62, 140, 279/902

(56) References Cited

U.S. PATENT DOCUMENTS

| | | | | |
|---|---|---|---|---|
| 4,381,116 A | * | 4/1983 | Futter | 279/62 |
| 6,182,978 B1 | * | 2/2001 | Hsueh | 279/62 |
| 6,302,407 B1 | * | 10/2001 | Hsueh | 279/62 |

* cited by examiner

*Primary Examiner*—Steven C. Bishop
(74) *Attorney, Agent, or Firm*—Bacon & Thomas, PLLC (57) ABSTRACT

A combination type electric drill chuck structure is mainly mounted on an electric drill. The chuck includes a drive body having head and tail ends, the middle thereof being provided with multiple inclined grooves for receiving multiple clamp pawls; a fixed shell secured fittingly at the tail end of the drive body; a sleeve threaded seat threadedly provided at head end of the drive body for engagement with the clamp pawls; a percussion ring provided with a spring for engaging the sleeve threaded seat in normal condition; a movable shell that utilizes an adjusting ring to adjust upper and lower positions. When the user turns the adjusting ring, the position of the movable shell can be adjusted to engage or disengage the sleeve threaded seat or fixed shell so as to achieve various operating modes of automatic percussion locking, manual locking and locking positioning of the drill bit.

12 Claims, 10 Drawing Sheets

COMBINATION TYPE ELECTRIC DRILL CHUCK STRUCTURE

BACKGROUND OF THE INVENTION (a) Field of the Invention:

The present invention relates to a chuck structure adapted for use with an electric drill, more particularly to a chuck structure that permits multiple operating modes of automatic percussion locking, manual locking and locking positioning of the drill bit by means of adjusting proper position of a movable shell.

(b) Description of the Prior Art:

A conventional chuck structure mainly includes a rotary shaft connected to a chuck. The chuck is externally provided with a rotatable outer shell and a fixed outer shell. The chuck is internally and annularly provided with inclined clamp pawls. The user can turn the rotatable outer shell to match rotation of threads to drive the clamp pawls to advance or withdraw obliquely so as to achieve clamping or releasing of the drill bit.

However, after locking, the rotatable outer shell is in a non-positioned state so that it may turn due to vibration or excessive torque so that the clamp pawls become loosened, which may result in dropping of the drill bit and may bring inconvenience and danger to the user.

SUMMARY OF THE INVENTION

The primary object of the present invention is to provide a combination type electric drill chuck structure in which a movable shell and a sleeve threaded seat are separated, and a force is applied to stop rotation of the movable shell during operation so that a percussion ring that originally rotates synchronously with the movable shell does not rotate, and rotational direction of the percussion ring is restricted. By matching action of a spring, the percussion ring can axially reciprocate to generate percussion with the sleeve threaded seat to thereby maintain tightness of threads and achieve an automatic locking mode.

Another object of the present invention is to provide a combination type electric drill chuck structure, in which the movable shell and the sleeve threaded seat are coupled so that by applying a force to rotate the movable shell, the clamp pawls can be brought to advance or withdraw obliquely to achieve drill clamping or releasing and a manual locking drill bit mode.

A further object of the present invention is to provide a combination type electric drill chuck structure, in which, by means of engagement of the movable shell and the fixed shell, the entire chuck assembly can be locked integrally so that the clamp pawls will not slip due to vibration or excessive torque to thereby maintain clamping force of the clamp pawls and achieve a drill bit locking positioning mode.

Still another object of the present invention is to provide a combination type electric drill chuck structure, in which after the drill bit locking positioning mode, a polygonal cavity of the sleeve threaded seat may be adapted for use in tightening or loosening of bolts in a sleeve use mode.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
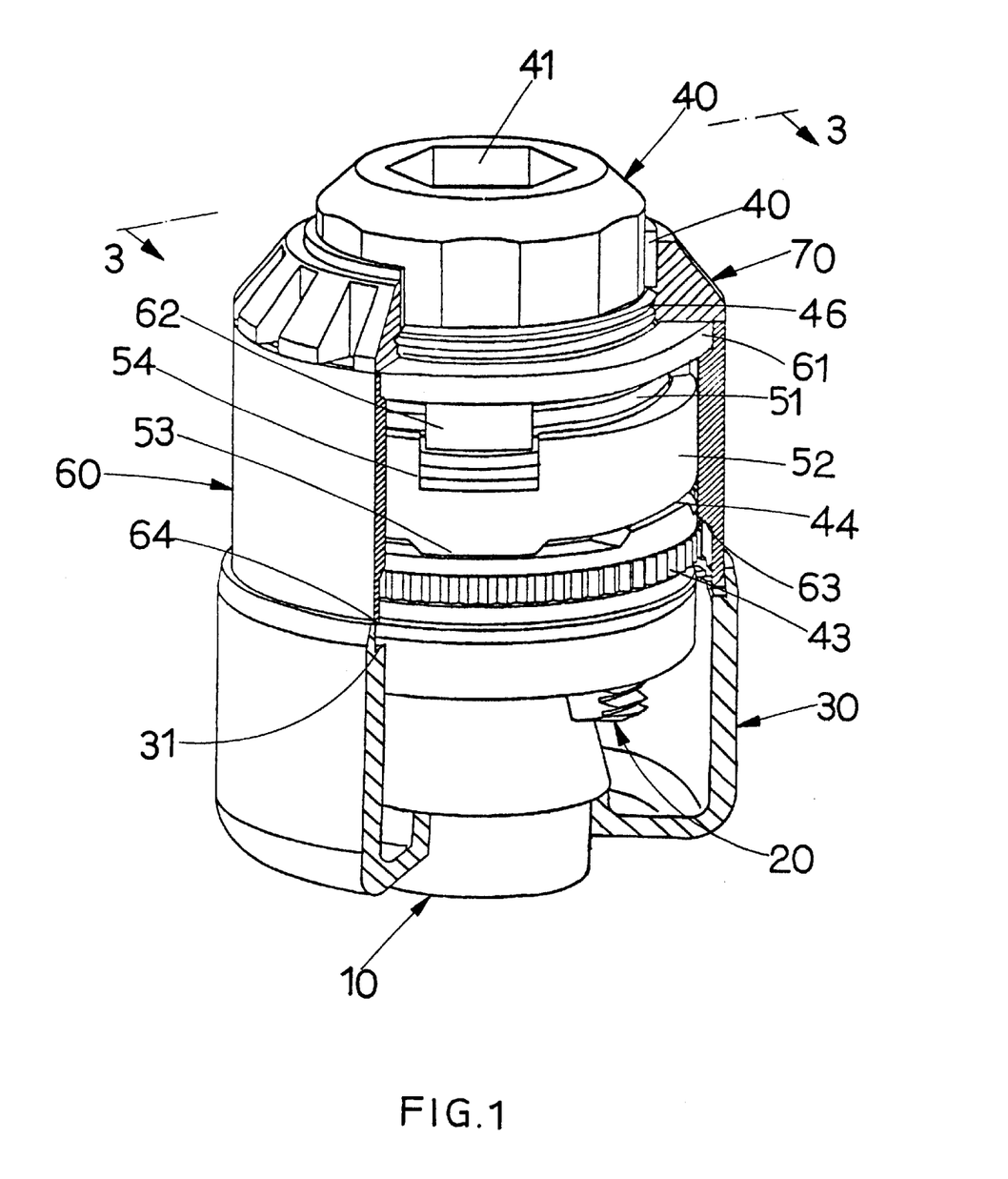
FIG. 1 is a perspective view of a chuck structure of the present invention.
Figure 2:
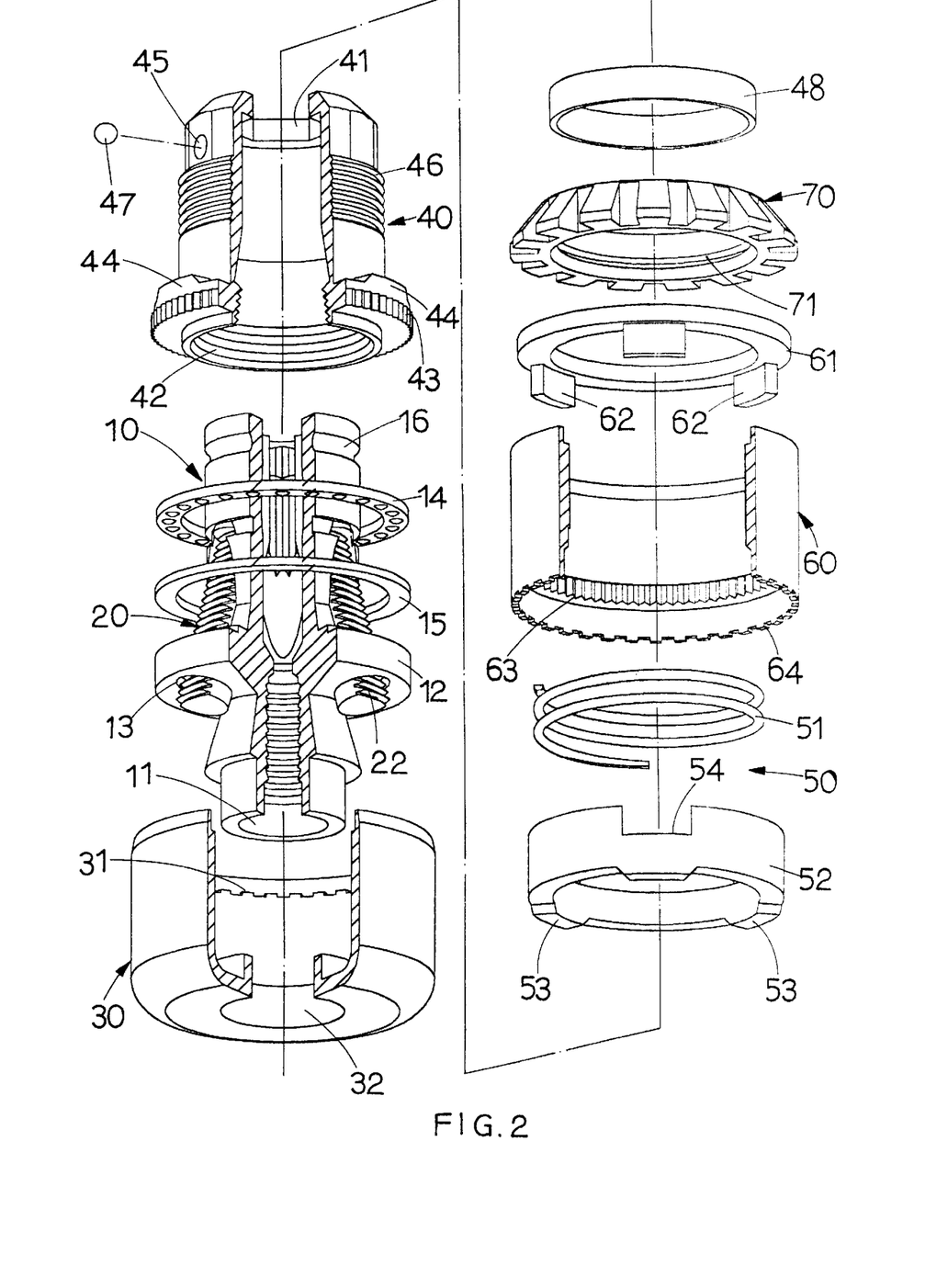
FIG. 2 is an exploded perspective view of the present invention.
Figure 3:
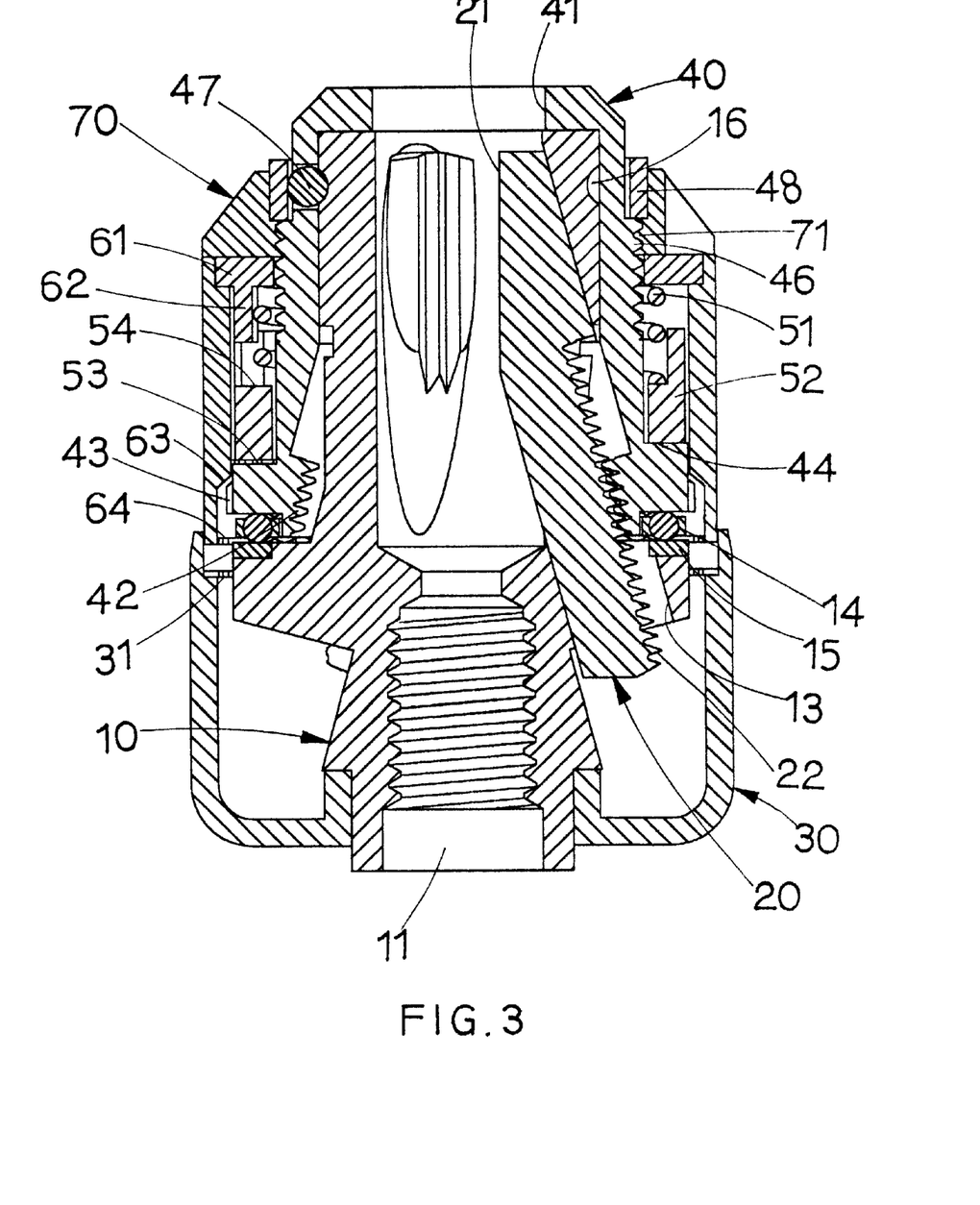
FIG. 3 is a sectional view taken along line 3—3 of FIG. 1.

With reference to FIGS. 1 to 3, the present invention includes a drive body 10, multiple clamp pawls 20, a fixed shell 30, a sleeve threaded seat 40, a percussion ring unit 50, a movable shell 60, and an adjusting ring 70.

The drive body 10 is a cylindrical body having head and tail ends. The center thereof is provided with a shaft hole 11 passing through the head and tail ends and being adapted to receive a drill bit 80 and for connection with a transmission shaft of an electric drill. The middle thereof is provided with an annular seat 12 projecting therefrom. The annular seat 12 is provided with a plurality of inclined grooves 13 for connection with the shaft hole 11. The upper surface of the annular seat 12 is provided with a ball race 14 and a packing ring 15. The head end is provided with a curved grooved ring 16.

The clamp pawls 20 are disposed in the grooves 13. Front ends and outer sides of the clamp pawls 20 are respectively provided with clamp faces 21 and threaded faces 22.

The fixed shell 30 is generally U-shaped with upper and lower openings. The upper and lower openings are respectively provided with axially oriented securing toothed ring 31 and securing hole 32. The securing hole 32 is secured to the tail end of the drive body 10 in tight fit.

The sleeve threaded seat 40 is generally inverted-U shaped with upper and lower openings. The upper and lower openings are respectively provided with polygonal cavity 41 and tapered threads 42 for fitting to the head end of the drive body 10. The tapered threads 42 are inter-engageable with the threaded face 22 of the clamp pawls 20 such that rotation of the tapered threads 42 will bring the clamp pawls 20 to advance or withdraw. The tail end of the sleeve threaded seat 40 is provided with an outer toothed ring 43. The upper side of the outer toothed ring 43 is provided with equidistantly spaced apart upper toothed blocks 44. The head ends and middle of the sleeve threaded seat 40 are respectively provided with a positioning hole 45 and outer threads 46. The positioning hole 45 receives a ball 47 that can project from the curved groove ring 16 of the drive body 10. A tightening ring 48 is fitted on the outside of the positioning hole 45 to pivotally connect the sleeve threaded seat 40 and drive body 10.

The percussion ring unit 50 is provided with a spring 51 and a percussion ring 52. The bottom side of the percussion ring 52 is provided with equidistantly spaced apart lower toothed blocks 53 that are subjected to the action of the spring 51 and that engage the upper toothed blocks 44 under a normal condition. The top side of the percussion ring 52 is axially provided with equidistantly spaced apart insert grooves 54.

The movable shell 60 is fitted on the outside of the percussion ring unit 50. The upper opening thereof is in tight fit with an annular cap 61. The annular cap 61 is subjected to the action of the spring 51, which forms an abutting face of displacement of the movable shell 60. The bottom side of the annular cap 61 is axially provided with equidistantly spaced apart track strips 62 for insertable connection with the insert grooves 54 of the percussion ring 52. Furthermore, the inner edge of the lower opening of the movable shell 60 is provided with stepped first and second toothed rings 63, 64, which may displace relative to each other to engage the outer and securing toothed rings 43, 31.

The adjusting ring 70 is a ring body that is internally provided with internal threads 71 for threaded engagement with the outer threads 46 of the sleeve threaded seat 40 so as to abut against the annular cap 61 of the movable shell 60.

Figure 4:
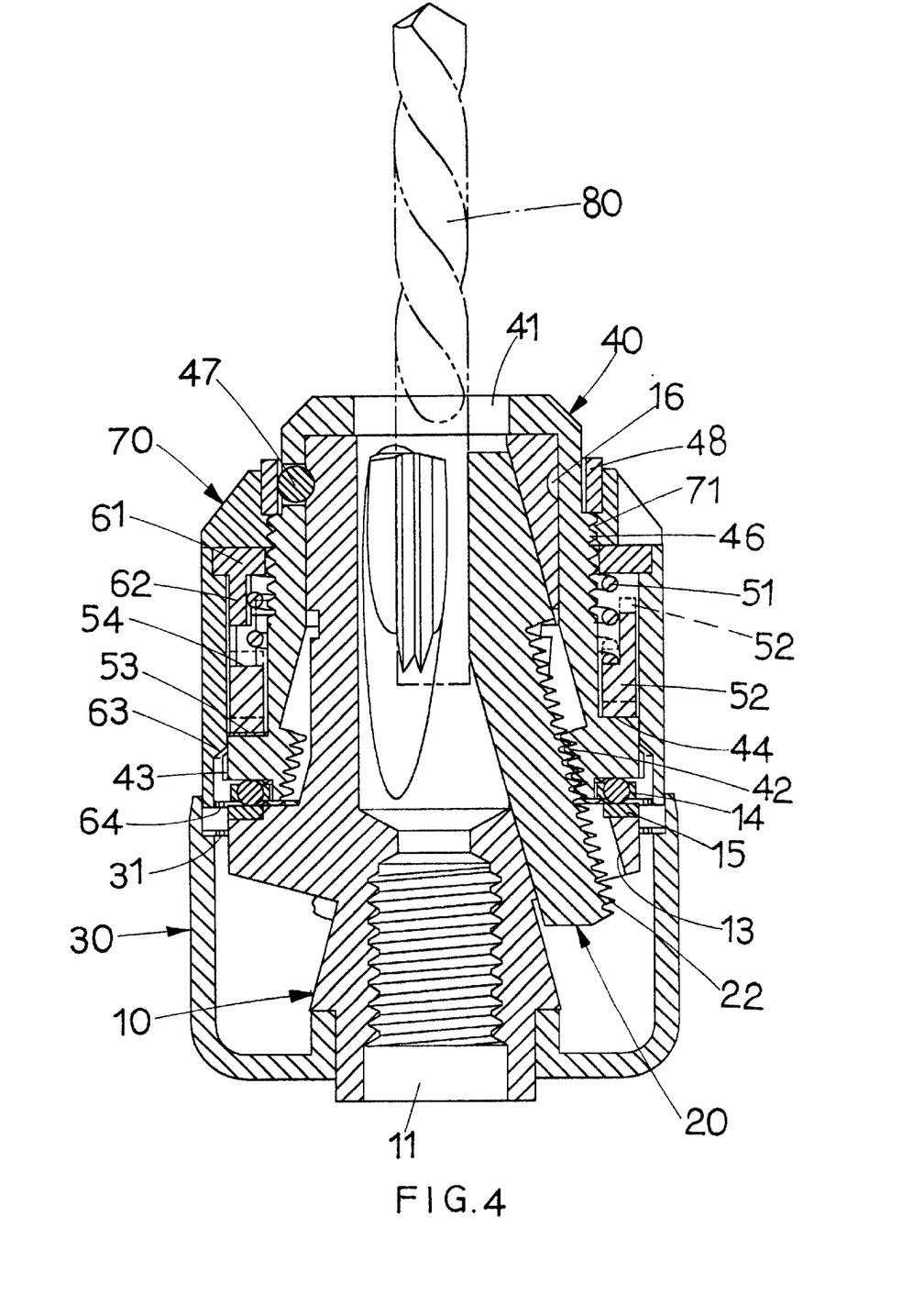
FIG. 4 is a schematic view illustrating automatic percussion locking of a drill bit mounted on the chuck structure of the present invention.

The embodiment of the present invention is illustrated with a drill bit 80 serving as the tool clamped by the present invention. The drill bit 80 is inserted into the axial hole 11 of the drive body 10. When the transmission shaft of the electric drill (not shown) rotates in a direction of action, the drive body 10 and the clamp pawls 20 are brought to rotate therewith. The threaded face 22 of the clamp pawls 20 are engaged with the tapered threads 42 of the sleeve threaded seat 40 such that the clamp pawl 20 rotates forwardly to clamp the drill bit 80. After clamping of the drill bit 80 in position, the entire chuck assembly will rotate. At this time, the automatic locking procedure is completed for subsequent drilling operation. If the drill bit 80 becomes loosened due to vibration generated during operation, or if re-drilling is necessary, the user may hold the movable shell 60 and exert a force to stop it from rotating. At this time, the percussion ring 52 that originally rotates synchronously with the movable shell 60 will not rotate, so that the rotational direction of the percussion ring 52 is restrained. By cooperating with the action of the spring 51, the lower and upper toothed blocks 53, 44 will generate percussion, and axially reciprocate along the track strips 62 of the ring cap 61 so as to enhance the tightness between the tapered threads 42 and threaded face 22, thereby achieving an automatic percussion locking mode of the drill bit 80 (as shown in FIG. 4).

Figure 5:
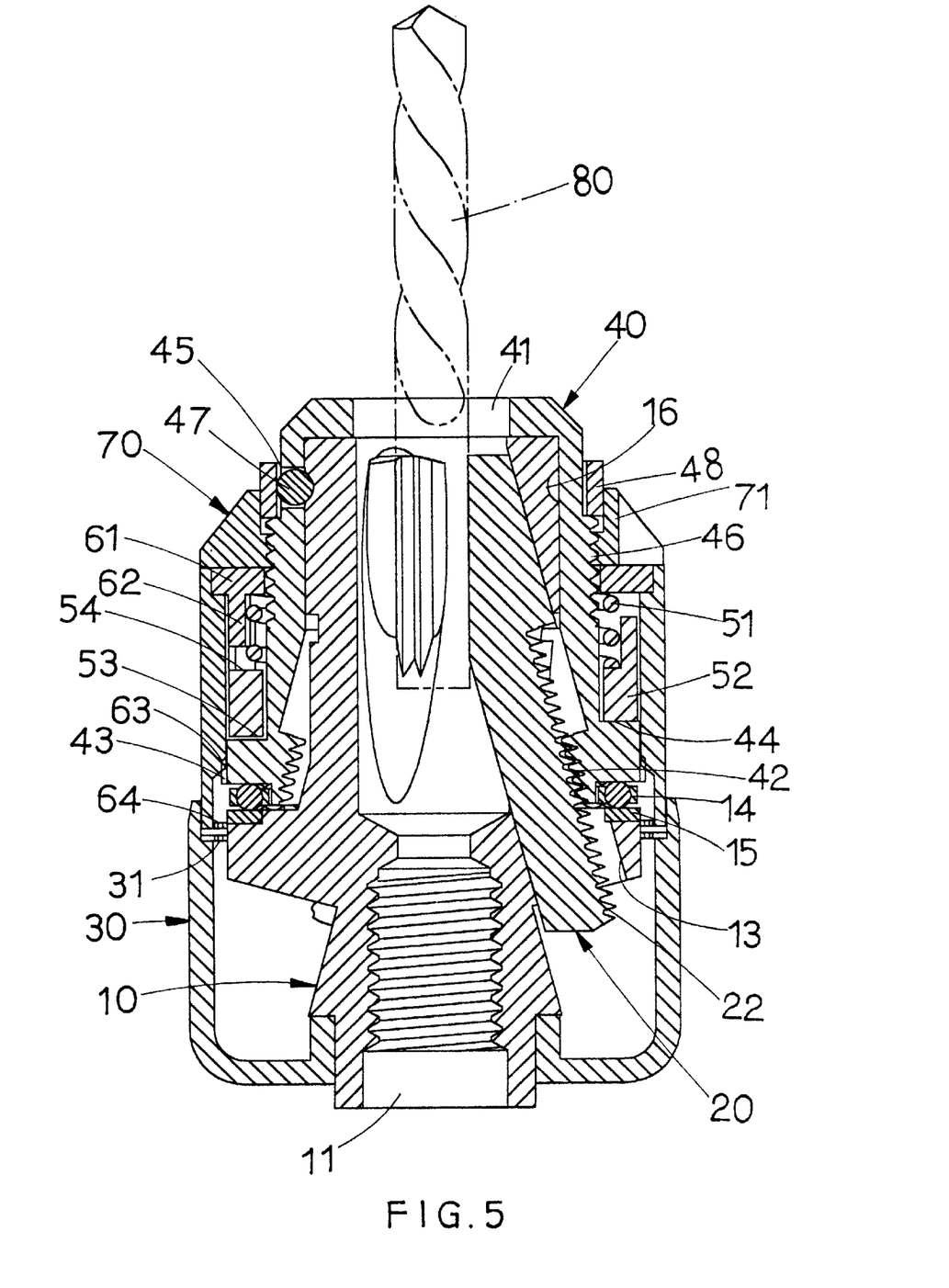
FIG. 5 is a schematic view illustrating manual locking of the drill bit mounted on the chuck structure of the present invention.

Referring to FIG. 5, when the adjusting ring 70 rotates downwardly, the movable shell 60 can be adjusted to displace downwardly, so that the first toothed ring 63 and the outer toothed ring 43 of the sleeve threaded seat 40 engage. At this time, by applying a force to the movable shell 60 to rotate the sleeve threaded seat 40 to allow the clamp pawl 20 to advance or withdraw, the drill bit 80 can be clamped or released, thereby achieving an automatic locking mode of the drill bit 80.

Figure 6:
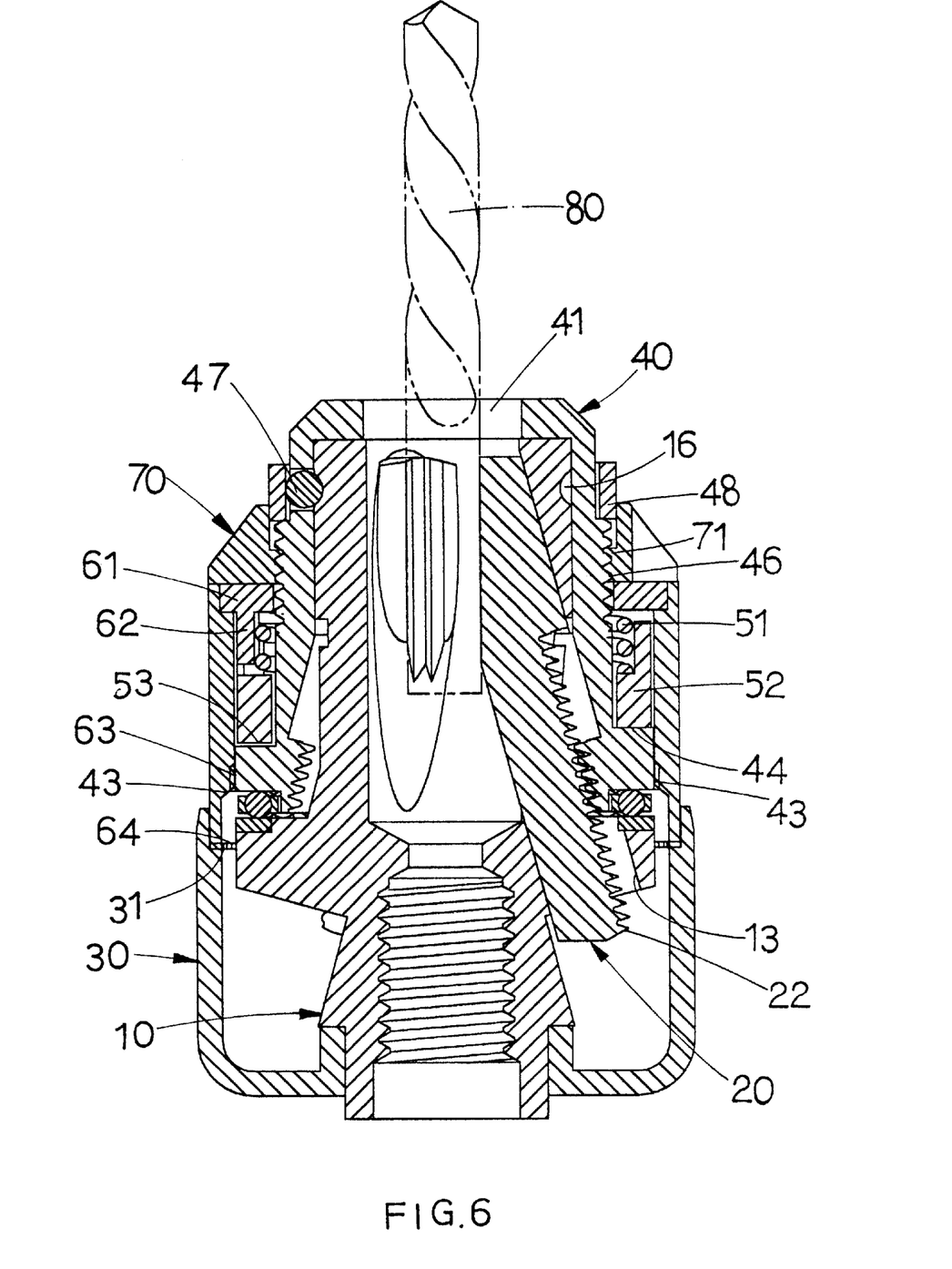
FIG. 6 is a schematic view illustrating locking and position of the drill bit mounted on the chuck structure of the present invention.

Referring to FIG. 6, when the adjusting ring 70 rotates further downwardly, the movable shell 60 can be adjusted to displace further downwardly, so that the second toothed ring 64 and the securing toothed ring 31 of the fixed shell 30 engage. Since the fixed shell 30 is fittingly secured at the rear end of the drive body 10, the entire chuck assembly can be locked as a whole so that the clamp pawl 20 will not become loosened due to vibration or due to excessive torque, thereby maintaining the securing force of the clamp pawl 20 and achieve a locking positioning mode of the drill bit 80.

Figure 7:
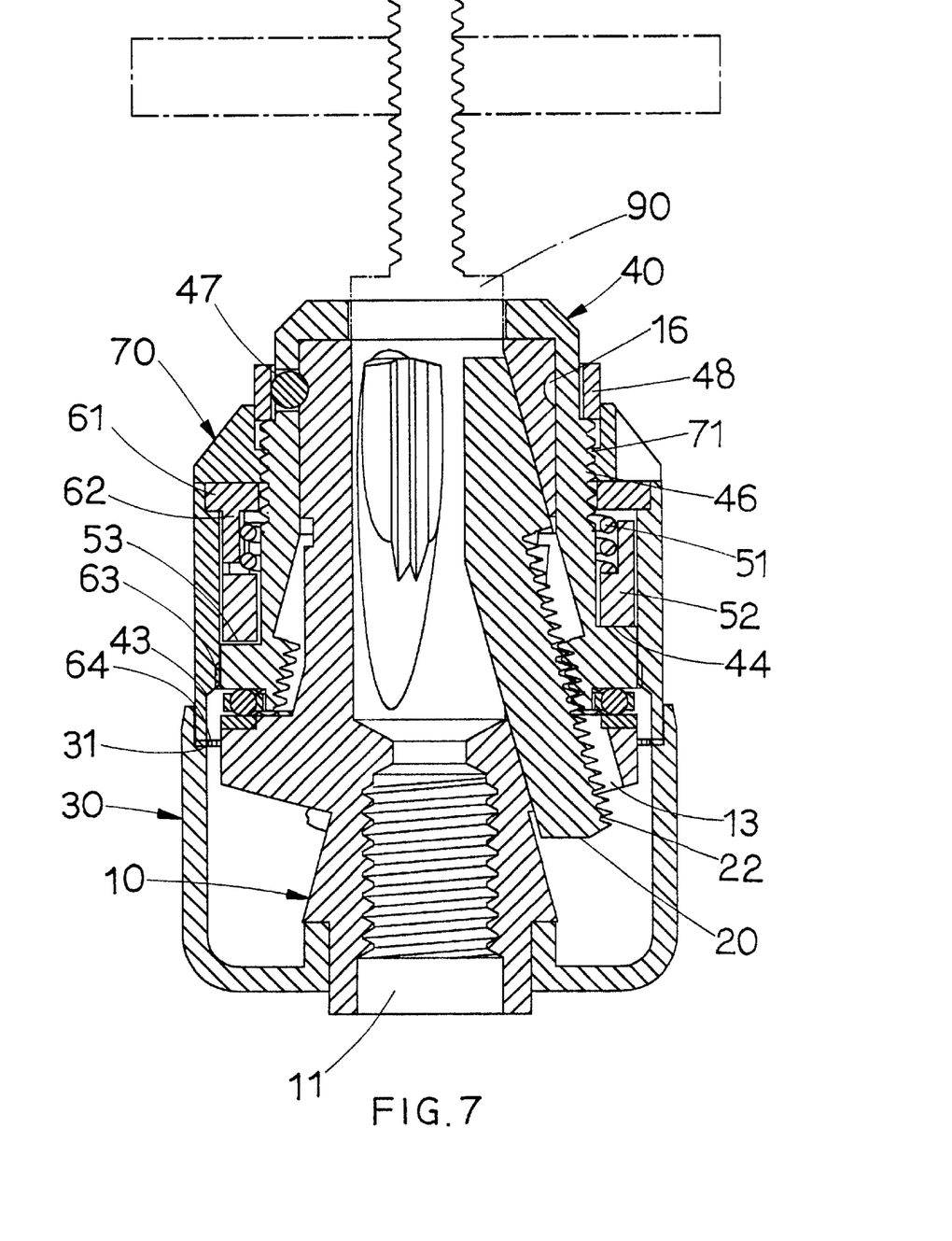
FIG. 7 is a schematic view illustrating use of the present invention with a bolt.

As shown in FIG. 7, the clamp pawl 20 may be withdrawn to a final position so that the polygonal cavity 41 is vacant. Then, the adjusting ring 70 is used to adjust the chuck to the drill bit locking positioning mode. At this time, by means of the polygonal cavity 41 of the sleeve threaded seat 40 that cooperates with the bolt 90, it can be operated like a sleeve to achieve a sleeve use mode.

Figure 8:
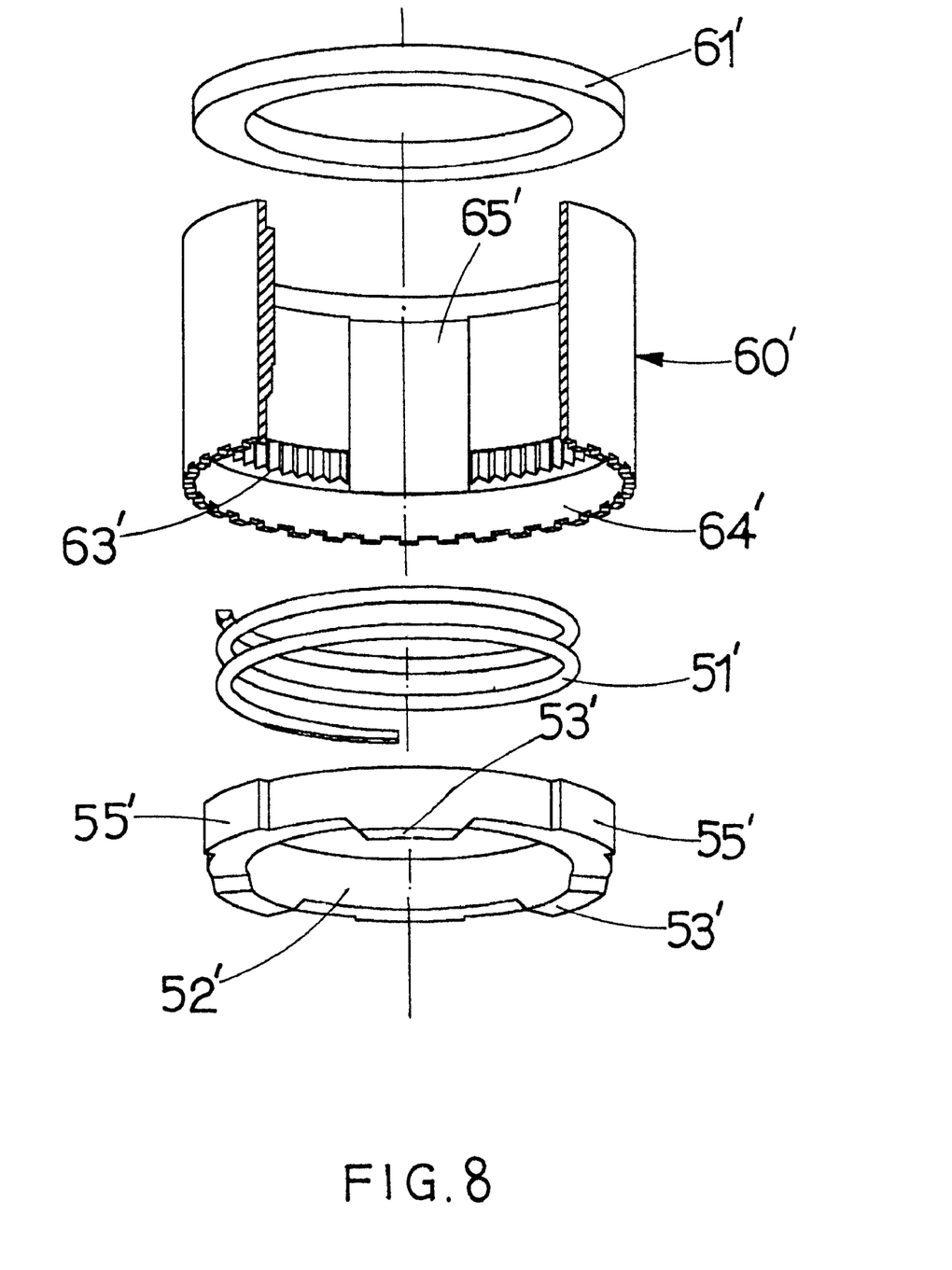
FIG. 8 illustrates the second embodiment of the chuck structure of the present invention.
Figure 9:
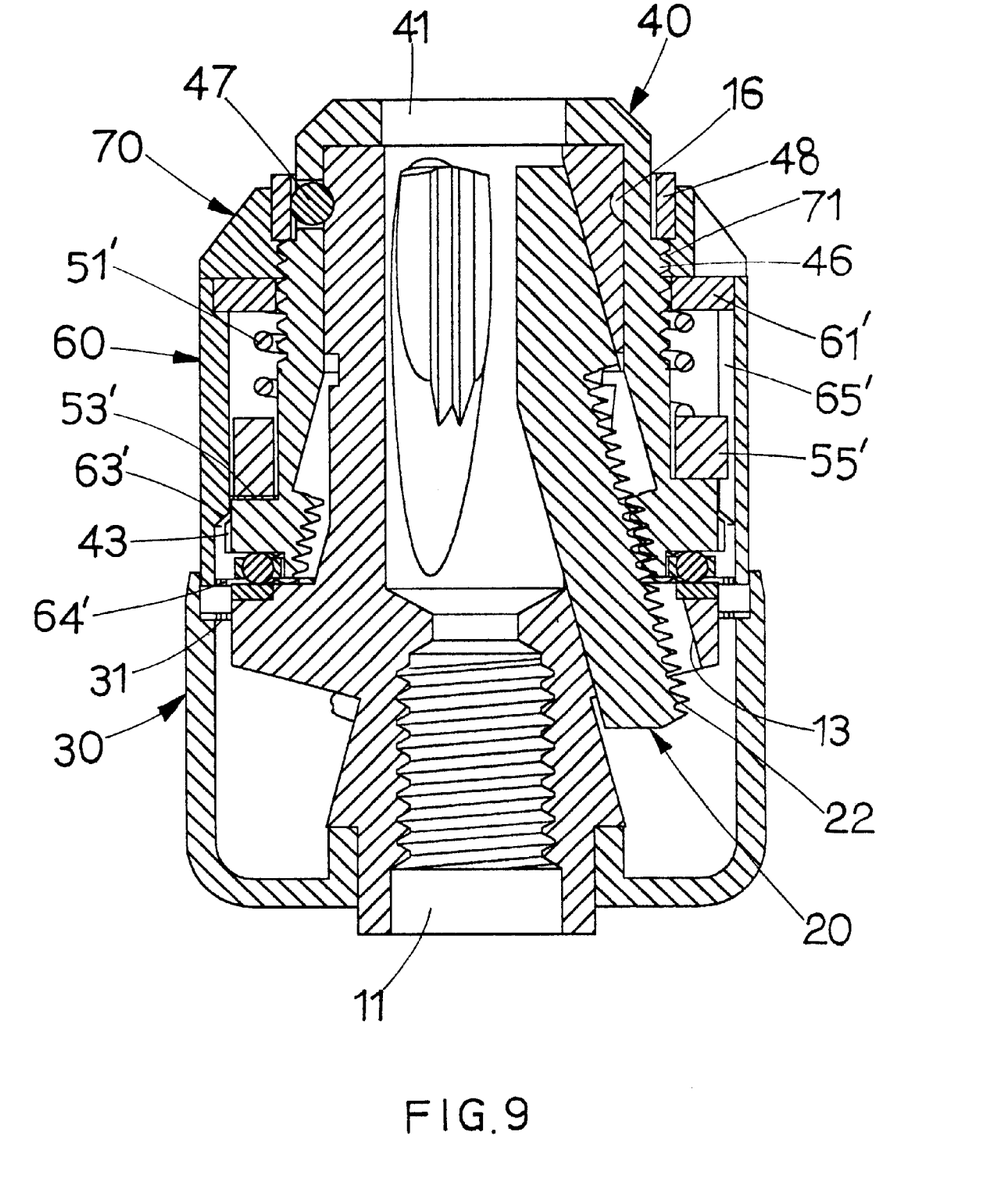
FIG. 9 is a sectional view of the second embodiment.

Furthermore, with reference to FIGS. 8 and 9, which shows another embodiment of the present invention, in addition to the lower toothed block 53', the percussion ring 52' is further provided with equidistantly spaced apart slide blocks 55' projecting the ring face. In addition to the first and second toothed rings 63', 64', the movable shell 60' may further be provided longitudinally with equidistantly spaced apart slide grooves 65' for insertable engagement with the slide blocks 55' so as to achieve sliding displacement. Besides, the annular cap 61' may correspondingly be configured to be a ring body.

Figure 10:
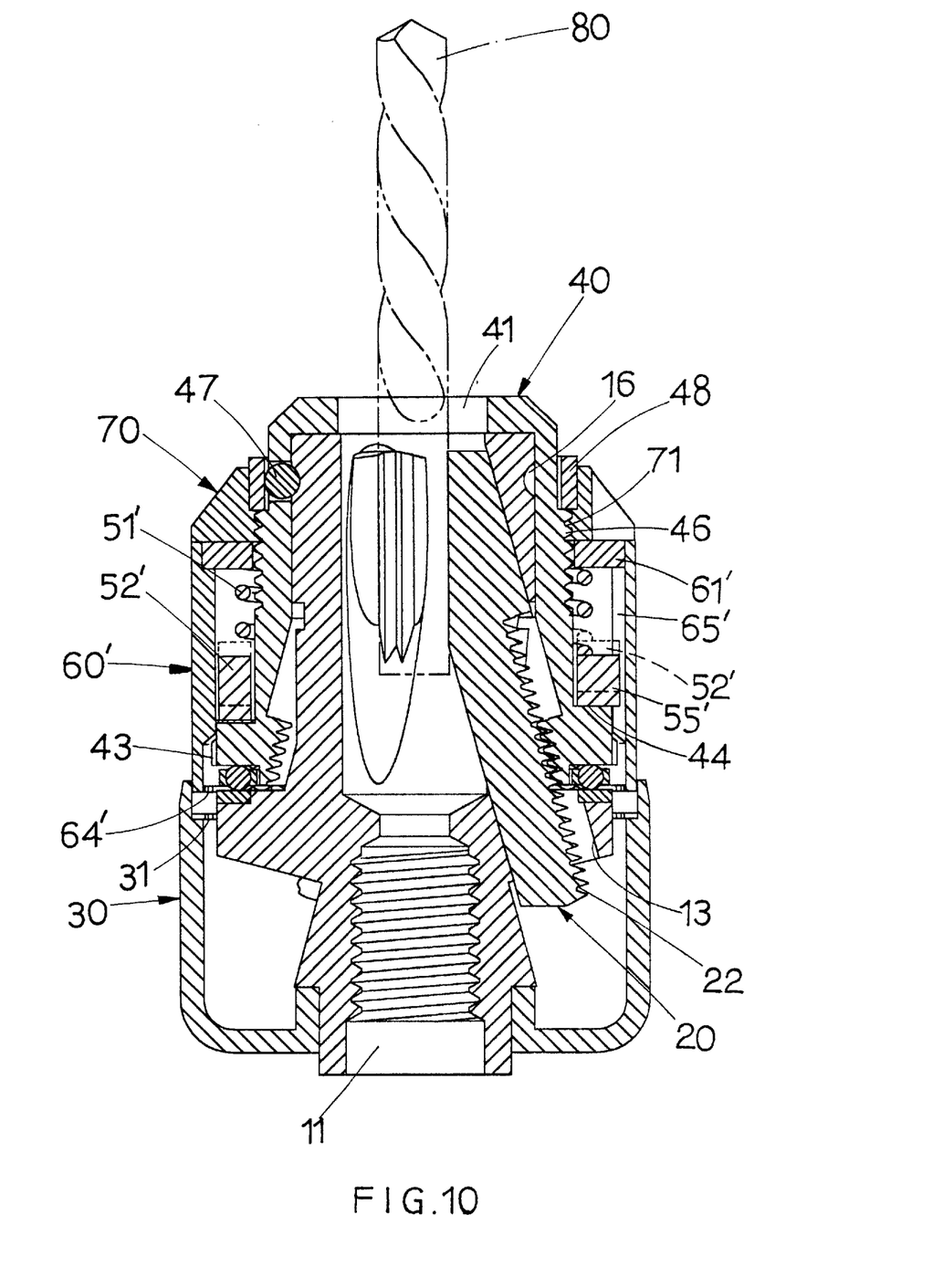
FIG. 10 is a schematic view illustrating automatic percussion locking of the drill bit mounted on the chuck structure of the present invention.

Referring to FIG. 10, after the drill bit 80 has been mounted in the above-described manner, when it is desired to select the automatic percussion locking mode, the user may hold the movable shell 60' and apply a force so stop it from rotating. At this time, the percussion ring 52' that originally rotates synchronously with the movable shell 60' will not rotate, achieving rotational control of the percussion ring 52'. Due to the action of the spring 51', the lower and upper toothed blocks 53', 44' will generate percussion, so that the percussion ring 52' reciprocates along the slide grooves 65' of the movable shell 60' to maintain the tightness between the tapered threads 42 and threaded face 22, thereby achieving another embodiment of automatic locking mode.

As for methods of operation of the manual locking and locking positioning modes, they are the same as that described above and will not be discussed in detail herein.

What is claimed is:

1. A combination type electric drill chuck structure, said chuck comprising:

a drive body that is generally a cylindrical shaft having head and tail ends, the middle thereof being provided with a plurality of inclined grooves for receiving multiple clamp pawls;

a fixed shell that is a generally U-shaped shell having upper and lower openings, said lower opening being provided with a securing hole for securing to said tail end of said drive body in tight fit;

a sleeve threaded seat that is a generally inverted-U shaped seat having upper and lower openings, and that is threadedly provided at said head end of said drive body for engagement with said clamp pawls, a middle thereof being provided with outer threads;

a percussion ring unit provided with a spring and a percussion ring and fitted on said sleeve threaded seat;

a movable shell fitted on said percussion ring unit, an upper opening thereof matching fittingly an annular cap, said annular cap being subjected to action of said spring to form an abutting face during displacement of said movable shell; and an adjusting ring provided within inner threads to be mounted threadedly on said sleeve threaded seat so as to abut against said annular cap of said movable shell.

2. The combination type electric drill chuck structure of claim 1, wherein said sleeve threaded seat has a tail end provided with an outer toothed ring.

3. The combination type electric drill chuck structure of claim 1, wherein an upper portion of said outer toothed ring of said sleeve threaded seat is provided with equidistantly spaced apart upper toothed blocks.

4. The combination type electric drill chuck structure of claim 1, wherein said upper opening of said fixed shell is provided with an axially oriented securing toothed ring.

5. The combination type electric drill chuck structure of claim 1, wherein said a bottom side of said percussion ring is provided with equidistantly spaced apart lower toothed blocks that may be subjected to action of said spring to engage with said upper toothed blocks of said sleeve threaded seat in a normal condition.

6. The combination type electric drill chuck structure of claim 1, wherein said a top side of said percussion ring is axially provided with equidistantly spaced apart insert grooves.

7. The combination type electric drill chuck structure of claim 1, wherein a bottom side of said annular cap is axially provided with equidistantly spaced apart track strips for insertable connection with said insert grooves of said percussion ring such that when a force is applied to stop rotation of said movable shell during rotation of said chuck, rotational direction of said insert grooves being restricted by said track strips so that said percussion ring reciprocates along said track strips to force said upper and lower toothed blocks to generate percussion to thereby maintain thread tightness and achieve an automatic locking mode.

8. The combination type electric drill chuck structure of claim 1, wherein an inner edge of said lower opening of said movable shell is provided with a stepped first toothed ring subjected to rotational control of said adjusting ring to adjust proper position of said movable shell so as to inter-engage with said outer toothed ring of said sleeve threaded seat to thereby achieve a manual locking drill bit mode.

9. The combination type electric drill chuck structure of claim 1, wherein an edge of said lower opening of said movable shell is provided with an axially oriented second toothed ring subjected to rotational control of said adjusting ring to adjust proper position of said movable shell so as to inter-engage with said securing toothed ring of said fixed shell and achieve a drill bit locking positioning mode.

10. The combination type electric drill chuck structure of claim 1, wherein said percussion ring further has equidistantly spaced apart slide blocks projecting from the ring surface thereof.

11. The combination type electric drill chuck structure of claim 1, wherein said annular cap may be a ring body.

12. The combination type electric drill chuck structure of claim 1, wherein said movable shell may further be internally provided with axially oriented equidistantly spaced apart slide grooves for reciprocating displacement with said slide blocks of said percussion ring.

* * * * *